United States Patent [19]

Hartsing, Jr.

[11] Patent Number: 4,851,287

[45] Date of Patent: Jul. 25, 1989

[54] LAMINATE COMPRISING THREE SHEETS OF A THERMOPLASTIC RESIN

[76] Inventor: Tyler F. Hartsing, Jr., 2404 Bryant Ave., Westfield, N.J. 07090

[21] Appl. No.: 149,993

[22] Filed: Jan. 28, 1988

Related U.S. Application Data

[63] Continuation of Ser. No. 53,090, May 20, 1987, abandoned, which is a continuation-in-part of Ser. No. 710,126, Mar. 11, 1985, abandoned.

[51] Int. Cl.$^4$ .................. B32B 5/16; B32B 27/08; B65D 81/34
[52] U.S. Cl. ................................. 428/325; 428/35.7; 428/402; 428/419; 428/483; 428/480; 428/412; 264/176.1; 229/3.1; 426/127
[58] Field of Search .................. 428/35, 419, 325, 402

[56] References Cited

U.S. PATENT DOCUMENTS

| | | | |
|---|---|---|---|
| 3,813,256 | 5/1974 | Feimberg | 99/171 LP |
| 3,821,015 | 6/1974 | Feinberg | 229/3.1 |
| 4,737,414 | 4/1988 | Hirt, Jr. | 428/412 |

FOREIGN PATENT DOCUMENTS 0083115 7/1983 European Pat. Off. .
0127852 5/1984 European Pat. Off. .

*Primary Examiner*—P. C. Ives

[57] ABSTRACT

Described herein is cookware formed from a laminate, said laminate comprising three sheets made from a thermoplastic resin, the inside sheet made from a thermoplastic resin having a lower use temperature than the two outside sheets.

2 Claims, No Drawings

LAMINATE COMPRISING THREE SHEETS OF A THERMOPLASTIC RESIN

REFERENCE TO RELATED APPLICATION

This is a continuation of application Ser. No. 53,090 filed May 20, 1987, now abandoned, which is a continuation-in-part of Ser. No. 710,126, filed Mar. 11, 1985, now abandoned.

FIELD OF THE INVENTION

This invention is directed to cookware formed from a lainate, said laminate comprising at least three sheets made from a thermoplastic resin, the inside sheet made from a thermoplastic resin having a lower use temperature than the thermoplastic resin the two outside sheets are made from. Also, this invention is directed to a laminate suitable for molding into cookware.

BACKGROUND OF THE INVENTION

Cookware utilized in conventional ovens should have the capability of withstanding the great temperature variations existing between the temperature setting devices and the actual temperatures within the oven. Though the cookware is only exposed to the oven's actual temperature, the user's expectations of the cookware's capacity to withstand heat is a critical factor in the use of that cookware. Putting cookware that deforms at e.g. 200° F. into an oven set for 325° F. is clearly illogical. Equally illogical would be the use of the same cookware in an oven whose temperature setting device fails to accurately control the oven's temperature. Thus a low temperature setting could result in a high oven temperature, and the cookware would still deform. The realities of life are that few commercially available gas and electric ovens have accurate temperature controls and in most cases the ovens run hotter than the temperature setting. In a number of cases, an oven temperature setting of 400° F. resulted in an oven temperature as high as 475°–500° F. This is the basis for the first sentence of this paragraph.

Plastics are typically termed thermoplastic or thermosetting. Thermoplastics are deformable with application of sufficient heat. Because thermosetting plastics (resins) are crosslinked, they are fairly resistent to heat deformation, certainly more so than thermoplastics. Consequently, thermosetting resins have been extensively used for cookware. For example, cookware have been made from melamine-formaldehyde resins, unsaturated polyester resins, and the like. Such plastics have excellent heat resistance. However, they do suffer from a number of significant deficiencies. Because they crosslink during their curing processes when molded, they shrink and pull away from the mold surfaces. Unless they are properly filled with small particulate fillers, the molded objects have very uneven surfaces, and they are subject to significant crazing and/or cracking. High filler loading adversely affects the physical properties of the molded object and precludes the direct obtaining of a glossy surface. Thermosetting resins are difficult to mold. They generally have to be compression or transfer-molded. Such processes require much materials handling, large equipment, complicated and relatively expensive molds, and significant energy costs.

Thermoplastics have been used for coating paper dishware and some of them have been used as cookware. However, their use as cookware is severely restricted, certainly to low temperature or microwave oven applications. Thermoplastics, such as UdelT polysulfone (made by Union Carbide Corporation), have been sold for use in making cookware designed for microwave oven applications. One would expect that some of such cookware has been generally employed in conventional ovens as well. However, UdelT polysulfone has not proven to be suitable for the wide temperatures used in conventional oven cooking and hence, its usage in such applications has not been recommended.

Thermoformed polyethylene terphthalate is used for cookware in microwave and conventional oven units, but is generally limited in use to about 350° F. Above this temperature, the modulus of the material drops rapidly so that cookware will sag and distort and will be unstable from a handling standpoint when removing from the oven with a food load present in the container. In the 400° F. range, the polyethylene terephthalate containers will distort severely and lose their shape.

Though the physical properties of a thermoplastic might be considered at first blush to be the basis for its use as generally employable cookware, i.e., cookware usable in any kind of oven up to a temperature of 500° F., such is clearly not the case. Since cookware is in con with the food placed therein, the plastic it is made from must be safe to use and not contaminate the food it contacts. Temperature gradients exist within conventional ovens and such a variable requires actual working information about a plastic's performance as cookware under a wide variety of conditions. Further, unless the cookware is intended to be disposable after the first use, it should have the capacity of withstanding repeated washings, by hand or by machine. It should be detergent resistant and not absorb food, oils and fats. It should be able to withstand warping on usage. If it is intended for household use, then it should meet the aesthetics typically favored, such as high gloss and smooth surfaces. Further, it is desirable that the thermoplastic be moldable into a variety of cookware configurations by a simple molding process such as vacuum forming or injection molding. Moreover, since the use conditions are quite severe, necessitating the use of a high performance plastic that tends to be more costly, then all of such performance capabilities are desirably achievable with the minimum amount of plastic usage.

U.S. Pat. No. 4,503,168 filed on May 25, 1983, in the name of T. F. Hartsing, issued Mar. 5, 1985, and titled "Cookware Made From Polyarylethersulfone" (commonly assigned) describes cookware made from a composition comprising a polyarylethersulfone as the sole polymeric component, or when blended with other polymer(s), the polyarylethersulfone constitutes greater than 30 weight percent, said weight percent based on the weight of the polymeric materials in the composition. Also, said U.S. Pat. No. 4,503,168 describes cookware made from a composition containing the polyarylthersulfone as having a good combination of physical properties.

U.S Pat. No. 4,576,842, filed on Mar. 19, 1984, in the name of T. F. Hartsing et al, issued Mar. 18, 1986, and titled "Cookware Formed From a Laminate" describes cookware made from a laminate, said laminate comprising at least three sheets made from a thermoplastic resin, an inside sheet made from a thermosplastic resin having a higher use temperature than the thermoplastic resin the two outside sheets are made from, said thermoplastic resin selected from a polyarylethersulfone, a poly(aryl ether), polyarylate, polyetherimide, polyester, aromatic polycarbonate, styrene resin, poly(aryl acrylate), polyhydroxyether, poly(arylene sulfide) or polyamide.

DESCRIPTION OF THE INVENTION

Cookware made from a laminate, said laminate comprising at three sheets made from a thermoplastic resin, an inside sheet made from a thermoplastic resin having a lower use temperature than the thermoplastic resin the two outside sheets are made from, said thermoplastic resin selected from a polyarylethersulfone, a poly(aryl ether), polyarylate, polyetherimide, polyester, aromatic polycarbonate, polyhydroxyether, poly(arylene sulfide) or polyamide.

A preferred laminate comprises at least three sheets, an inside sheet made from a thermoplastic resin selected from a polycarbonate with the outside sheets being made from a polyarylethersulfone. Another preferred laminate comprises at least three sheets, the inside sheet made from poly(ethylene terephthalate) and the outside sheets made from a polyarylethersulfone. Yet, another preferred laminate comprises at least three sheets, the inside sheet made from a poly(aryl ether) and the outside sheets made from a polyarylethersulfone.

Cookware made from the laminate of this invention meets the key requirements needed for cookware molded from plastic materials described above. The cookware of this invention is suitable for use in conventional as well as microwave ovens.

The cookware of this invention is an improvement over that described in U.S. Pat. No. 4,576,842, since it can be used at higher oven temperatures and does not deform at the higher temperatures.

The use temperature or heat deflection temperature of the thermoplastic polymer is measured by ASTM-D-648.

THE THERMOPLASTIC POLYMERS

A. Polyarylethersulfones

The polyarylethersulfones of this invention are amorphous thermoplastic polymers containing units of the formula:

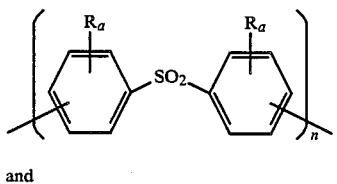
(I)

and

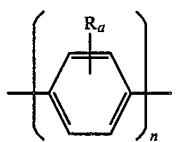
(II)

and/or

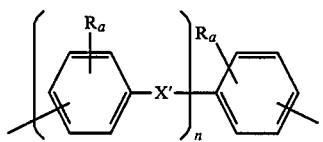
(III)

wherein R is independently hydrogen, $C_1$ to $C_6$ alkyl or $C_4$ to $C_8$ cycloalkyl, X' is independently

wherein $R_1$ and $R_2$ are independently hydrogen or $C_1$ to $C_9$ alkyl, or

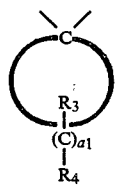

wherein $R_3$ and $R_4$ are independently hydrogen or $C_1$ to $C_8$ alkyl, and $a_1$ is an integer of 3 to 8; —S—, —O—, or

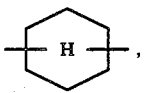

a is an integer of 0 to 4 and n is independently an integer of 1 to 3 and wherein the ratio of unit (I) to the sum of units (II) and/or (III) is greater than 1. The units are attached to each other by an —O— bond.

A preferred polymer of this invention contains units of the formula:

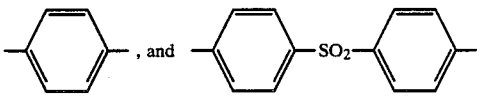

Another preferred polyarylethersulfone of this invention contains units of the formula:

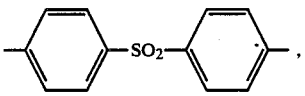

and

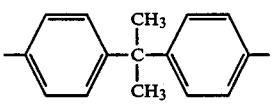

These units are attached to each other by an —O— bond.

The polyaryethersulfone may e random or may have an ordered structure.

The polyarylethersulfones of this invention have a reduced viscosity of from about 0.4 to greater than about 2.5, as measured in N-methylpyrolidone, or other suitable solvent, at 25° C.

The polyarylethersulfones of this invention are prepared by reacting the monomers represented by the following formulae:

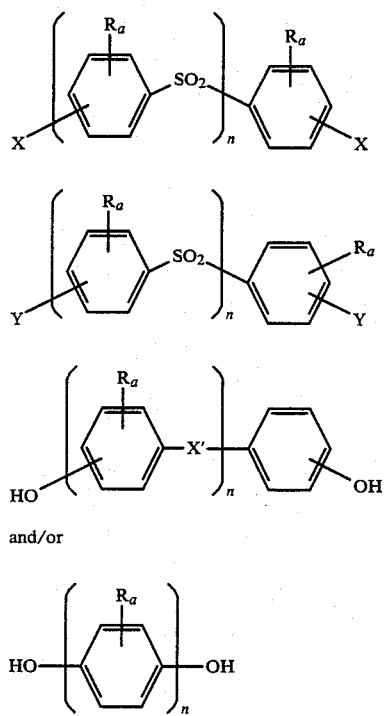

wherein R, a, X' and n are as previously defined, and X and Y are independently selected, from Cl, BR, F, NO₂ or OH and at least 50 percent of the Y's are OH.

The ratio of the concentration of OH groups to Cl, Br, F and/or NO₂ groups used to form the polyarylethersulfone is from about 0.90 to about 1.10, preferably from about 0.98 to about 1.02.

The monomers, represented by formulas (IV), (V), (VI) and (VII), include the following:
2,2-bis(4-hydroxyphenyl)propane,
bis(4-hydroxyphenyl)methane,
4,4'-dihydroxydiphenyl sulfide,
4,4'-dihydroxydiphenyl ether,
4,4'-dihydroxydiphenyl sulfone,
2,4'-dihydroxydiphenyl sulfone,
4,4'-dichlorodiphenyl sulfone,
4,4'-dinitrodiphenyl sulfone,
4-chloro-4'-hydroxydiphenyl sulfone,
4,4'-biphenol, hydroquinone, and the like.

The preferred monomers include hydroquinone, 4,4-biphenol, 2,2-bis(4-hydroxyphenyl) propane, 4,4'-dichlorodiphenyl sulfone, and 4,4-dihydroxydiphenyl sulfone or 4 chloro-4'hydroxydiphenyl sulfone.

The polymers of this invention are prepared by contacting substantially equimolar amounts of the hydroxy containing compounds (depicted in formulas (IV) to (VII) supra) and halo and/or nitro containing compounds (depicted in formula (IV) and (V) supra) with from about 0.5 to about 1.0 mole of an alkali metal carbonate per mole of hydroxyl group in a solvent mixture comprising a solvent which forms an azeotrope with water in order to maintain the reaction medium at substantially anhydrous conditions during the polymerization.

The temperature of the reaction mixture is kept at from about 120° to about 180° C. for about 1 to about 5 hours and then raised and kept at from about 200° to about 250° C., preferably from about 210° to about 230° C., for about 1 to 10 hours.

The reaction is carried out in an inert atmosphere, e.g., nitrogen, at atmospheric pressure, although higher or lower pressures may also be used.

The polyarylethersulfone is then recovered by conventional techniques such as coagulation, solvent evaporation, and the like.

The solvent mixture comprises a solvent which forms an azeotrope with water and a polar aprotic solvent. The solvent which forms an azeotrope with water includes an aromatic hydrocarbon such as benzene, toluene, xylene, ethylbenzene, chlorobenzene, and the like.

The polar aprotic solvents employed in this invention are those generally known in the art for the manufacture of polyarylether sulfones and include sulfur containing solvents such as those of the formula:

in which each $R_5$ represents a monovalent lower hydrocarbon group free of aliphatic unsaturation, which preferably contains less than about 8 carbon atoms or when connected together represents a divalent alkylene group with b being an integer from 1 to 2 inclusive. Thus, in all of these solvents all oxygens and two carbon atoms are bonded to the sulfur atom. Contemplated for use in this invention are such solvents as those having the formula:

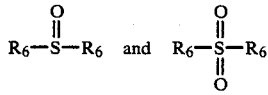

where the $R_6$ groups are independently lower alkyl, such as methyl, ethyl, propyl, butyl, and like groups, and aryl groups such as phenyl and alkylphenyl groups such as the tolyl group, as well as those where the $R_6$ groups are interconnected as in a divalent alkylene bridge such as:

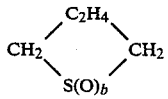

in tetrahydrothiophene oxides and dioxides. Specifically, these solvents include dimethylsulfoxide, dimethylsulfone, diphenylsulfone, diethylsulfoxide, diethylsulfone, diisopropylsulfone, tetrahydrothiophene 1,1-dioxide (commonly called tetramethylene sulfone or sulfolane) and tetrahydrothiophene-1 monoxide.

Additionally, nitrogen containing solvents may be used. These include dimethyl acetamide, dimethyl formamide and N-methylpyrolidone.

The azeotrope forming solvent and polar aprotic solvent are used in a weight ratio of from about 10:1 to about 1:1, preferably from about 7:1 to about 5:1.

In the reaction, the hydroxy containing compound is slowly converted, in situ, to the alkali salt thereof by reacting with the alkali metal carbonate. The alkali metal carbonate is preferably potassium carbonate. Mixtures of carbonates such as potassium and sodium carbonate may also be used.

Water is continuously removed from the reaction mass as an azeotrope with the azeotrope forming solvent so that substantially anhydrous conditions are maintained during the polymerization.

It is essential that the reaction medium be maintained substantially anhydrous during the polycondensation. While amounts of water up to about one percent can be tolerated, and are somewhat beneficial when employed with fluorinated dihalobenzenoid compounds, amounts of water substantially greater than this are desirably avoided as the reaction of water with the halo and/or nitro compound leads to formation of phenolic species and only low molecular weight products are secured. Consequently, in order to secure the high polymers, the system should be substantially anhydrous, and preferably contain less than 0.5 percent by weight water during the reaction.

Preferably, after the desired molecular weight has been attained, the polymer is treated with an activated aromatic halide or an aliphatic halide such as methyl chloride or benzyl chloride, and the like. Such treatment of the polymer converts the terminal hydroxyl groups into ether groups which stabilize the polymer. The polymer so treated has good melt and oxidative stability.

B. Polyarylether Resin

The poly(aryl ether) resin suitable for blending with the polyarylethersulfone, is different from the polyarylethersulfone and is a linear, thermoplastic polyarylene polyether containing recurring units of the following formula:

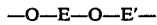

wherein E is the residuum of a dihydric phenol, and E' is the residuum of a benzenoid compound having an inert electron withdrawing group in at least one of the positions ortho and para to the valence bonds; both of said residua are valently bonded to the ether oxygens through aromatic carbon atoms. Such aromatic polyethers are included within the class of polyarylene polyester resins described in, for example, U.S Pat. Nos. 3,264,536 and 4,175,175. It is preferred that the dihydric phenol be a weakly acidic dinuclear phenol such as, for example, the dihydroxyl diphenyl alkanes or the nuclear halogenated derivatives thereof, such as, for example, the 2,2-bis(4-hydroxyphenyl)propane, 1,1-bis(4-hydroxyphenyl)2-phenyl ethane, bis(4-hydroxyphenyl)methane, or their chlorinated derivatives containing one or two chlorines on each aromatic ring. Other materials also termed appropriately bisphenols are also highly valuable and preferred. These materials are the bisphenols of a symmetrical or unsymmetrical joining group, as, for example, ether oxygen (13 O—), carbonyl

sulfone

or hydrocarbon residue in which the two phenolic nuclei are joined to the same or different carbon atoms of the residue.

Such dinuclear phenols can be characterized as having the structure:

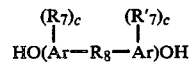

wherein Ar is an aromatic group and preferably is a phenylene group, $R_7$ and $R'_7$ can be the same or different inert substituent groups such as alkyl groups having from 1 to 4 carbons atoms, aryl, halogen atoms, i.e., fluorine, chlorine, bromine or iodine, or alkoxyl radicals having from 1 to 4 carbon atoms, the c's are independently integers having a value of from 0 to 4, inclusive, and $R_8$ is representative of a bond between aromatic carbon atoms as in dihydroxyl-diphenyl, or is a divalent radical, including for example, radicals such as

—O—, —S—, —SO—, —S—S—, —SO$_2$, and divalent hydrocarbon radicals such as alkylene, alkylidene, cycloalkylene, cycloalkylidene, or the halogen, alkyl, aryl or like substituted alkylene, alkylidene and cycloaliphatic radicals as well as aromatic radicals and rings fused to both Ar groups.

Examples of specific dihydric polynuclear phenols including among others: the bis-(hydroxyphenyl) alkanes such as 2,2-bis-(4-hydroxyphenyl)propane, 2,4'-dihydroxydiphenylmethane, bis-(2-hydroxyphenyl)methane, bis-(4-hydroxyphenyl)methane, bis(4-hydroxy-2,6-dimethyl-3-methoxyphenyl)methane, 1,1-bis-(4-hydroxy-phenyl)ethane, 1,2-bis-(4-hydroxyphenyl)ethane, 1,1-bis-(4-hydroxy-2-chlorophenyl)ethane, 1,1-bis-(3-methyl-4-hydroxyphenyl)propane, 1,3-bis-(3-methyl-4-hydroxyphenyl)propane, 2,2-bis-(3-phenyl-4-hydroxyphenyl)propane, 2,2-bis-(3-isopropyl-4-hydroxyphenyl)propane, 2,2-bis-(2-isopropyl-4-hydroxyphenyl)propane, 2,2-bis(4-hydroxy-naphthyl)propane, 2,2-bis-(4-hydroxyphenyl)pentane, 3,3-bis-(4-hydroxyphenyl)pentane, 2,2-bis-(4-hydroxyphenyl)heptane, bis-(4-hydroxyphenyl)phenylmethane, 2,2-bis-(4-hydroxyphenyl)-1-phenyl-propane, 2,2-bis-(4-hydroxyphenyl)-1,1,1,3,3,3,-hexafluoropropane, and the like;

di(hydroxyphenyl)sulfones such as bis-(4-hydroxyphenyl)sulfone, 2,4'-dihydroxydiphenyl sulfone, 5-chloro-2,4'-dihydroxydiphenyl sulfone, 5'-chloro-4,4'-dihydroxydiphenyl sulfone, and the like;

di(hydroxyphenyl)ethers such as bis-(4-hydroxyphenyl)ether, the 4,3'-, 4,2'-2,2'-2,3-, dihydroxyphenyl ethers, 4,4'-dihydroxyl-2,6-dimethyldiphenyl ether,bis-(4-hydroxy-3-isobutylphenyl)ether, bis-(4-hydroxy-3-isopropylphenyl)ether, bis-(4-hydroxy-3-chlorophenyl)ether, bis-(4-hydroxy-3-fluorophenyl)ether, bis-(4-hydroxy-3-bromophenyl)ether, bis(4-hydroxynaphthyl)ether, bis-(4-hydroxy-3-chloronaphthyl)ether, and 4,4'-dihydroxyl-3,6-dimethoxydiphenyl ether.

As herein used the E' term defined as being the "residuum of the dihydric phenol" of course refers to the residue of the dihydric phenol after the removal of the two aromatic hydroxyl groups. Thus as is readily seen these polyarylene polyethers contain recurring groups of the residuum of the dihydric phenol and the residuum of the benzenoid compound bonded through aromatic ether oxygen atom.

Any dihalobenzenoid or dinitrobenzenoid compound or mixtures thereof can be employed in this invention which compound or compounds has the two halogens or nitro-groups bonded to benzene rings having an electron withdrawing group in at least one of the positions ortho and para to the halogen or nitro group. The dihalobenzenoid or dinitrobenzenoid compound can be either mononuclear where the halogens or nitro groups are attached to the same benzenoid rings or polynuclear where they are attached to different benzenoid rings, as long as there is an activating electron withdrawing group in the ortho or para position of that benzenoid nuclear. Fluorine and chlorine substituted benzenoid reactants are preferred; the fluorine compounds for fast reactivity and the chlorine compounds for their inexpensiveness. Fluorine substituted benzenoid compounds are most preferred, particularly when there is a trace of water present in the polymerization reaction system. However, this water content should be maintained below about 1% and preferably below 0.5% for best results.

An electron withdrawing group can be employed as the activator group in these compounds. It should be, of course, inert under the reaction conditions, but otherwise its structure is not critical. Preferred are the strong activating groups such as the sulfone group

bonding two halogen or nitro substituted benzenoid nuclei as in the 4,4'-dichlorodiphenyl sulfone and 4,4'-difluorodiphenyl sulfone, although such other strong withdrawing groups hereinafter mentioned can also be used with equal ease.

The more powerful of the electron withdrawing groups give the fastest reactions and hence are preferred. It is further preferred that the ring contain no electron supplying groups on the same benzenoid nucleus as the halogen or nitro group; however, the presence of other groups on the nucleus or in the residuum of the compound can be tolerated.

The activating group can be basically either of two types:

a) Monovalent groups that activate one or more halogens or nitro-groups on the same ring such as another nitro or halo group, phenylsulfone, or alkylsulfone, cyano, trifluoromethyl, nitroso, and hetero nitrogen, as in pyridine.

(b) Divalent groups which can activate displacement of halogens on two different rings, such as the sulfone group

the carbonyl group

the vinylene group

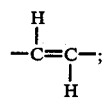

the sulfoxide group

the azo group —N=N—; the saturated fluorocarbon groups

—$CF_2$—$CF_2CF_2$—; organic phosphine oxides

where $R_9$ is hydrocarbon group, and the ethylidene group

where A can be hydrogen or halogen.

If desired, the polymers may be made with mixtures of two or more dihalobenzenoid or dinitrobenzenoid compounds. Thus, the E' residuum of the benzenoid compounds in the polymer structure may be the same or different.

It is seen also that as used herein, the E' term defined as being the "residuum of the benzenoid compound" refers to the aromatic or benzenoid residue of the compound after the removal of the halogen atom or nitro group on the benzenoid nucleus.

The polyarylene polyethers of this invention are prepared by methods well known in the art as for instance the substantially equimolar one-step reaction of a double alkali metal salt of dihydric phenol with a dihalobenzenoid compound in the presence of specific liquid organic sulfoxide or sulfone solvents under substantially anhydrous conditions. Catalysts are not necessary for this reaction.

The polymers may also be prepared in a two-step process in which a dihydric phenol is first converted in situ in the primary reaction solvent to the alkali metal salt of the reaction with the alkali metal, the alkali metal hydride, alkali metal hydroxide, alkali metal alkoxide or the alkali metal alkyl compounds. Preferably, the alkali metal hydroxide is employed. After removing the water which is present or formed, in order to secure substantially anhydrous conditions, the dialkali metal salts of the dihydric phenol are admixed and reacted with about stoichiometric quantities of the dihalobenzenoid or dinitrobenzenoid compound.

Additionally, the polyethers may be prepared by the procedure described in, for example, U.S. Pat. No. 4,176,222 in which a substantially equimolar mixture of at least one bisphenol and at least one dihalobenzenoid are heated at a temperature of from about 100° to about 400° C. with a mixture of sodium carbonate or bicarbonate and a second alkali metal carbonate or bicarbonate having a higher atomic number than that of sodium.

Further, the polyethers may be prepared by the procedure described in Canadian Pat. No. 847,963 wherein the bisphenol and dihalobenzenoid compound are heated in the presence of potassium carbonate using a high boiling solvent such as diphenylsulfone.

Preferred polyarylene polyethers of this invention are those prepared using the dihydric polynuclear phenols of the following four types, including the derivatives thereof which are substituted with inert substituent groups

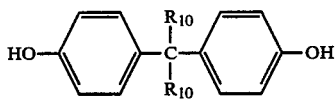
(a)

in which the $R_{10}$ groups represent independently hydrogen, lower alkyl, aryl and the halogen substituted groups thereof, which can be the same or different;

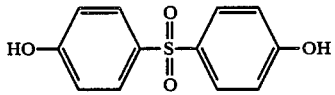
(b)

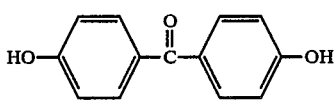
(c)

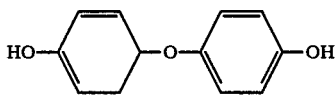
(d)

and substituted derivatives thereof.

It is also contemplated in this invention to use a mixture of two or more different dihydric phenols to accomplish the same ends as above. Thus when referred to above the —E— residum in the polymer structure can actually be the same or different aromatic residua.

The poly(aryl ether)s have a reduced viscosity of from about 0.35 to about 1.5 as measured in an appropriate solvent at an appropriate temperature depending on the particular polyether, such as in methylene chloride at 25° C.

The preferred poly(aryl ether)s have repeating units of the formula:

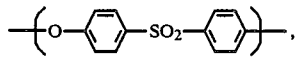

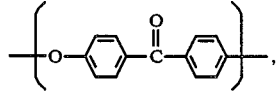

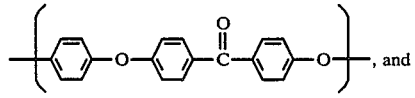, and

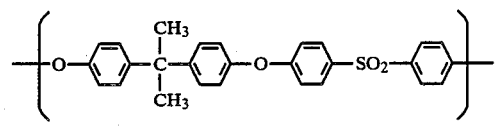

C. Polyarylates

The thermoplastic polymers which may be blended with the polyarylethersulfone or blend of polyarylethersulfone and poly(aryl ether) include polyarylates, polyetherimides, polyesters, aromatic polycarbonates, styrene resins, poly-(alkyl acrylates), polyhydroxyethers, poly(arylene sulfide) and polyamides.

A. Polyarylates

The polyarylates which are suitable for use in this invention are derived from a dihydric phenol and at least one aromatic dicarboxylic acid and have a reduced viscosity of from about 0.4 to greater than about 1.0, preferably from about 0.6 to about 0.8 dl/gm, as measured in chloroform (0.5 g/100 ml chloroform) or other suitable solvent at 25° C.

A particularly desirable dihydric phenol is of the following formula:

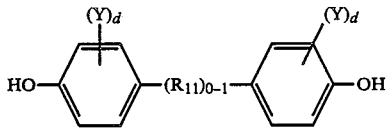

wherein Y is independently selected from, hydrogen, alkyl groups of 1 to 4 carbon atoms, chlorine or bromine, each d, independently, has a value of from 0 to 4, inclusive, and $R_{11}$ is a divalent saturated or unsaturated aliphatic hydrocarbon radical, particularly an alkylene or alkylidene radical having from 1 to 6 carbon atoms, or a cycloalkylidene or cycloalkylene radicals having up to and including 9 carbon atoms, O, CO, $SO_2$, or S. The dihydric phenols may be used individually or in combination.

The dihydric phenols that may be used in this invention include the following:
2,2-bis-4(4-hydroxyphenyl)propane;
bis-(2-hydroxyphenyl)methane;
bis-(4-hydroxyphenyl)methane;
bis-(4-hydroxy-2,6-dimethyl-3-methoxyphenyl) methane,
1,1-bis-(4-hydroxyphenyl)ethane;
1,2-bis-(4-hydroxyphenyl)ethane;
1,1-bis-(4-hydroxy-2-chlorophenyl)ethane;
1,3-bis-(3-methyl-4-hydroxyphenyl)ethane;
1,3-bis-(3-methyl-4-hydroxyphenyl)propane;
2,2-bis-(3-phenyl-4-hydroxyphenyl)propane;
2,2-bis-(3-isopropyl-4-hydroxyphenyl) propane,
2,2-bis-(2-isopropyl-4-hydroxyphenyl) propane,
2,2-bis-(4-hydroxyphenyl)pentane;
3,3-bis-(4-hydroxyphenyl)pentane;
2,2-bis-(4-hydroxyphenyl)heptane;
1,2-bis-(4-hydroxyphenyl)1,2-bis-(phenyl)propane,
4,4'-(dihydroxyphenyl)ether;
4,4'-(dihydroxyphenyl)sulfide;
4,4'-(dihydroxyphenyl)sulfone;
4,4'-(dihydroxyphenyl)sulfoxide;
4,4'-(dihydroxybenzophenone), and
naphthalene diols.

The aromatic dicarboxylic acids that may be used in this invention include terephthalic acid, isophthalic acid, any of the naphthalene dicarboxylic acids and mixtures thereof, as well as alkyl substituted homologs of these carboxylic acids, wherein the alkyl group contains from 1 to about 4 carbon atoms, and acids containing other inert substituents, such as halides, alkyl or aryl ethers, and the like. Acetoxybenzoic acid can also be used. Preferably, mixtures of isophthalic and terephthalic acids are used. The isophthalic acid to terephthalic acid ratio in the mixture is about 0:100 to about 100:0, while the most preferred acid ratio is about 75:25 to about 50:50. Also, from about 0.5 to about 20 percent of aliphatic diacids containing from 2 to about 10 carbon atoms, such as adipic acid, sebacic acid, and the like may be additionally used in the polymerization reaction.

The polyarylates of the present invention can be prepared by any of the well known prior art polyester forming reactions, such as the reaction of the acid chlorides of the aromatic dicarboxylic acids with the dihydric phenols; the reaction of the diaryl esters of the aromatic dicarboxylic acids with the dihydric phenols; or the reaction of the aromatic diacids with diester derivatives of the dihydric phenol. These processes are described in, for example, U.S. Pat. Nos. 3,317,464; 3,948,856; 3,780,148; 3,824,213; and 3,133,898.

The polyarylates are preferably prepared by the process as set forth in U.S. Pat. No. 4,321,355. This process comprises the follow steps:

(a) Reacting an acid anhydride derived from an acid containing from 2 to 8 carbon atoms with at least one dihydric phenol to form the corresponding diester; and (b) reacting said diester with at least one aromatic dicarboxylic acid at a temperature sufficient to form the polyarylate, wherein the improvement comprises removing residual acid anhydride after formation of the dihydric phenol diester so that its conentration is less than about 1500 parts per million.

The acid anhydride suitable is derived from an acid containing from 2 to 8 carbon atoms. The preferred acid anhydride is acetic anhydride.

The dihydric phenol is described above.

Generally, the dihydric phenol reacts with the acid anhydride under conventional esterification conditions to form the dihydric phenol diester. The reaction may take place in the presence or absence of a solvent. Additionally, the reaction may be conducted in the presence of a conventional esterification catalyst or in the absence thereof.

D. Polyetherimides

The polyetheridimides suitable for use in this invention are well known in the art and are described in, for example, U.S. Pat. Nos. 3,847,867, 3,838,097 and 4,107,147.

The polyetherimides are of the following formula:

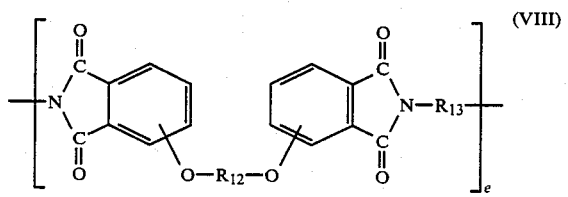

(VIII)

wherein e is an integer greater than 1, preferably from about 10 to about 10,000 or more, —O—$R_{12}$—O is attached to the 3 to 4 and 3' or 4' positions and $R_{12}$ is selected from (a) a substituted or unsubstituted aromatic radical such as

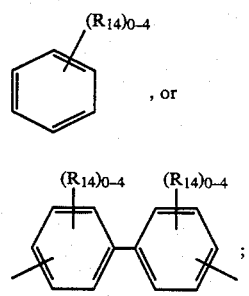

, or (b) a divalent radical of the formula:

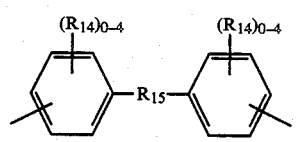

wherein $R_{14}$ is independently $C_1$ to $C_6$ alkyl, aryl or halogen and $R_{15}$ is selected from —O—, —S—,

—$SO_2$—, —SO—, alkylene of 1 to 6 carbon atoms, cycloalkylene of 4 to 8 carbon atoms, alkylidene of 1 to 6 carbon atoms or cycloalkylidene of 4 to 8 carbon atoms, $R_{13}$ is selected from an aromatic hydrocarbon radical having from 6 to 20 carbon atoms and halogenated derivatives thereof, or alkyl substituted derivatives thereof, wherein the alkyl group contains 1 to 6 carbon atoms, alkylene and cycloalkylene radicals having from 2 to 20 carbon atoms and $C_2$ to $C_8$ alkylene terminated polydiorganosiloxane or a divalent radical of the formula

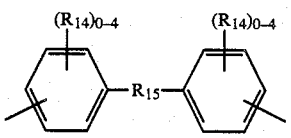

wherein $R_{14}$ and $R_{15}$ are as previously defined.

The polyetherimides may also be of the following formula:

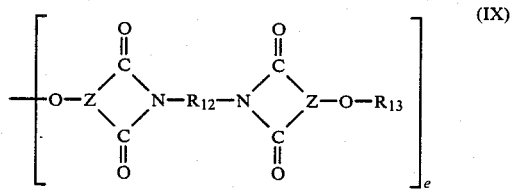

(IX)

wherein —O—Z is a member selected from

wherein $R_{16}$ is independently hydrogen, lower alkyl or lower alkoxy

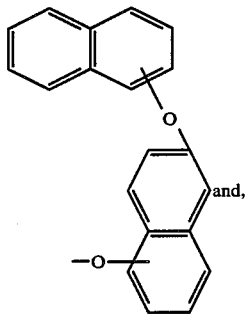

wherein the oxygen may be attached to either ring and located ortho or para to one of the bonds of the imide carbonyl groups, $R_{12}$ and $R_{13}$ and e are as previously defined.

These polyetherimides are prepared by methods well known in the art as set forth in, for example, U.S. Pat. Nos. 3,833,544, 3,887,588, 4,017,511, 3,965,125 and 4,024,110.

The polyetherimides of Formula (VIII) can, for example, be obtained by any of the methods well-known to those skilled in the art including the reaction of any aromatic bis(ether anhydride)s of the formula

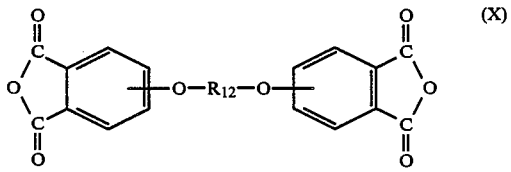

where $R_{12}$ is as defined hereinbefore, with a diamino compound of the formula $$H_2N-R_{13}-NH_2 \qquad (XI)$$

where $R_{13}$ is as defined hereinbefore. In general, the reactions can be advantageously carried out employing well-known solvents, e.g., o-dichloro-benzene, m-cresol/toluene, N,N-dimethylacetamide, etc., in which to effect interaction between the dianhydrides and diamines, at temperatures of from about 20° to about 250° C. Alternatively, the polyetherimides can be prepared by melt polymerization of any dianhydrides of Formula (X) with any diamino compound of Formula (XI) while heating the mixture of the ingredients at elevated temperatures with concurrent intermixing. Generally, melt polymerization temperatures between about 200° to 400° C. and preferably 230° to 300° C. can be employed. Any order of addition of chain stoppers ordinarily employed in melt polymerizations can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides, however, in certain instances, a slight molar excess (about 1 to 5 mole percent) of diamine can be employed resulting in the production of polyetherimides of Formula I have an intrinsic viscosity h greater than 0.2 deciliters per gram, preferably 0.35 to 0.60, or 0.7 deciliters per gram or even higher when measured in m-cresol at 25° C.

The aromatic bis(ether anhydride)s of Formula (X) include, for example,
2,2-bis[4-(2,3-dicarboxyphenoxy)phenyl]-propane dianhydride;
4,4'-bis(2,3-dicarboxyphenoxy)diphenyl ether dianhydride;
1,3-bis(2,3-dicarboxyphenoxy)benzene dianhydride;
4,4'-bis(2,3-dicarboxyphenoxy)diphenyl sulfide dianhydride;
1,4-bis(2,3-dicarboxyphenoxy)benzene dianhydride;
4,4'-bis(2,3-dicarboxyphenoxy)benzophenone dianhydride;
4,4-bis(2,3-dicarboxyphenoxy)diphenyl sulfone dianhydride;
2,2-bis[4-(3,4-dicarboxyphenoxy)phenyl]-propane dianhydride;
4,4'-bis(3,4-dicarboxyphenoxy)diphenyl ether dianhydride;
4,4'-bis(3,4-dicarboxyphenoxy)diphenyl sulfide dianhydride;
1,3-bis(3,4-dicarboxyphenoxy)benzene dianhydride;
1,4-bis(3,4-dicarboxyphenoxy)benzene dianhydride;
4,4'-bis(3,4-dicarboxyphenoxy)benzophenone dianhydride; 4-(2,3-dicarboxyphenoxy)-4'-(3,4-dicarboxyphenoxy)diphenyl-2,2-propane dianhydride; etc. and mixtures of such dianhydrides.

The organic diamines of Formula (XI) include, for example, m-phenylenediamine, p-phenylenediamine, 2,2-bis(p-aminophenyl)propane, 4,4'-diaminodiphenylmethane, 4,4'-diaminodiphenyl sulfide, 4,4'-diaminodiphenyl sulfone, 4,4'-diaminodiphenyl ether, 1,5-diaminonaphthalene, 3,3'-dimethylbenzidine, 3,3'-dimethoxybenzidine.

The polyetherimides for formula (X) may, for example, be prepared by effecting reaction in the presence of a dipolar aprotic solvent of a mixture of ingredients comprising, for instance, (1) a bis(nitrophthalimide) of the general formula:

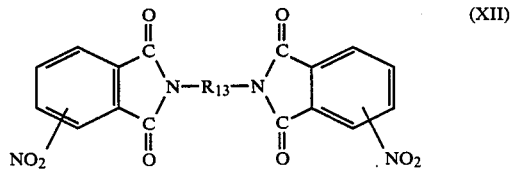

wherein $R_{13}$ is defined as hereinabove, and (2) an alkali metal salt of an organic compound of the general formula:

$$MO-R_{12}-OM \qquad (XIII)$$

wherein M is an alkali metal and $R_{12}$ is defined as hereinabove.

The bis(nitrophthalimide) used in preparing the polymer is formed by reacting a diamine of the formula described above, $NH_2-R_{13}-NH_2$, with a nitro-substituted aromatic anhydride of the formula:

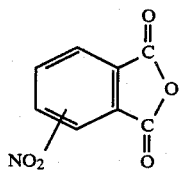

(XIV)

The molar ratio of diamine to anhydride should ideally be about 1:2 respectively. The initial reaction product is a bis(amide-acid) which is subsequently dehydrated to the corresponding bis(nitrophthalimide).

The diamines are described, supra.

The preferred nitrophthalic anhydrides useful in the present invention are 3-nitrophthalic anhydride, 4-nitrophthalic anhydride and mixtures thereof. These reactants are commercially available in reagent grade. They may also be prepared by the nitration of phthalic anhydride using procedures described in Organic Syntheses, Collective Vol. I, Wiley (1948), page 408. Certain other closely related nitroaromatic anhydrides may also be used in the reaction and are illustrated for example by 2-nitronaphthalic anhydride, 1-nitro-2,3-naphthalene-dicarboxylic anhydride and 3-methoxy-6-nitrophthalic anhydride, and the like.

With reference to the alkali metal salts of formula (XIII) among the divalent carbocyclic aromatic radicals which $R_{12}$ may represent (mixtures of such radicals are also included) are, for instance, divalent aromatic hydrocarbon radicals of from 6 to 20 carbon atoms, such as phenylene, biphenylene, naphthylene, etc. Included are residues of, e.g. hydroquinone, resorcinol, chlorohydroquinone, etc. In addition, $R_{12}$ may be a residue of a dihydroxyl diarylene compound in which the aryl nuclei are joined by either an aliphatic group, a sulfoxide group, sulfonyl group, sulfur, carbonyl group, oxygen, etc. Typical of such diarylene compounds are the following:

2,4-dihydroxydiphenylmethane;
bis(2-hydroxyphenyl)methane;
2,2-bis(4-hydroxyphenyl)propane;
bis(4-hydroxyphenyl)methane;
bis(4-hydroxy-5-nitrophenyl)methane;
bis(4-hydroxy-2,6-dimethyl-3-methoxy-phenyl)methane;
1,1-bis(4-hydroxyphenyl)ethane;
1,2-bis(4-hydroxyphenyl)ethane;
1,1-bis(4-hydroxy-2-chlorophenyl)ethane;
1,1-bis(2,5-dimethyl-4-hydroxyphenyl)ethane;
1,3-bis(3-methyl-4-hydroxyphenyl)propane;
2,2-bis(3-phenyl-4-hydroxyphenyl)propane;
2,2-bis(3-isopropyl-4-hydroxyphenyl)propane;
2,2-bis(4-hydroxynaphthyl)propane;
hydroquinone;
naphthalene diols;
bis(4-hydroxyphenyl)ether;
bis(4-hydroxyphenyl)sulfide;
bis(4-hydroxyphenyl)sulfone; and the like.

When dialkali metal salts of formula (XIII) are used with the compound illustrated by formula (XII), the ingredients are advantageously present in an equal molar ratio for optimum molecular weight and properties of the polymer. Slight molar excesses, e.g., about 0.001 to 0.10 molar excess of either the dinitro-substituted organic compound or of the dialkali metal salt of formula (XIII) may be employed. When the molar ratios are approximately equal, the polymer is substantially terminated by a $=Z-NO_2$ at one end and a phenolic group at the other end. If there is a molar excess of one compound, that particular terminal group will predominate.

The conditions of reaction whereby the alkali-metal salt of formula (XIII) is reacted with the dinitro-substituted organic compound of formula (XII) can be varied widely. Generally, temperatures of the order of about 25° to about 150° C. are advantageously employed, although it is possible to employ lower or higher temperature conditions depending on the ingredients used, the reaction product sought, time of reaction, solvent employed, etc. In addition to atmospheric pressure, superatmospheric pressures and subatmospheric pressures may be employed depending upon the other conditions of reaction, the ingredients used, the speed at which it is desired to effect reaction, etc.

The time of reaction also can be varied widely depending on the ingredients used, the temperature, the desired yield, etc. It has been found that times varying from about 5 minutes to as much as 30 to 40 hours are advantageously employed to obtain the maximum yield and desired molecular weight. Thereafter the reaction product can be treated in the appropriate manner required to effect precipitation and/or separation of the desired polymeric reaction product. Generally, common solvents such as alcohols (e.g. methanol, ethanol, isopropyl alcohol, etc.) and aliphatic hydrocarbons (e.g. pentane, hexane, octane, cyclohexane, etc.) may be employed as precipitants for this purpose.

It is important that the reaction between the dinitrosubstituted organic compound of formula V and the alkali-metal salt of formula VI (mixtures of such alkali-metal salts can also be used) be carried out in the presence of a dipolar aprotic solvent.

The polymerization is performed under anhydrous conditions usually using dipolar aprotic solvents such as dimethylsulfoxide which are added in varying amounts depending upon the particular polymerization. A total quantity of solvent, dipolar aprotic solvent or mixture of such solvent with an aromatic solvent sufficient to give a final solution containing 10 to 20% by weight of polymer is preferably employed.

The preferred polyetherimides include those having repeating units of the following formula:

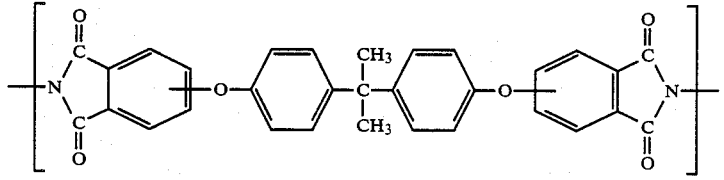

E. Polyesters

The polyesters which are suitable for use herein are derived from an alipyhatic or cyloaliphatic diol, or mixtures thereof, containing from 2 to about 10 carbon atoms and at least one aromatic dicarboxylic acid. The polyesters which are derived from an aliphatic diol and an aromatic dicarboxylic acid have repeating units of the following general formula:

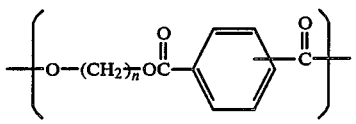
(XV)

wherein n is an integer of from 2 to 10.

The preferred polyester is poly(ethylene terephthalate).

Also contemplated herein are the above polyesters with minor amounts. e.g., from 0.5 to about 2 percent by weight, of units derived from aliphatic acids and/or aliphatic polyols, to form copolyesters. The aliphatic polyols include glycols, such as poly(ethylene glycol). These can be made following the teachings, for example. U.S. Pat. Nos. 2,465,319 and 3,047,539.

The polyesters which are derived from a cycloaliphatic diol and an aromatic dicarboxylic acid are prepared by condensing either the cis- or trans-isomer (or mixtures thereof) of, for example, 1,4-cyclohexanedimethanol with an aromatic dicarboxylic acid so as to produce a polyester having recurring units of the following formula:

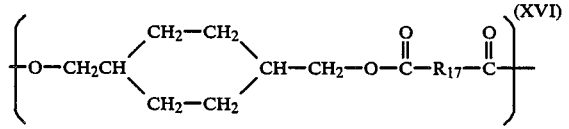
(XVI)

wherein the cyclohexane ring is selected from the cis- and trans-isomers thereof and $R_{17}$ represents an aryl radical containing 6 to 20 carbon atoms and which is the decarboxylated residue derived from an aromatic dicarboxylic acid.

Examples of aromatic dicarboxylic acids indicated by $R_{17}$ in formula IX, are isophthalic or terephthalic acid, 1,2-di(p-carboxylphenyl)ethane, 4,4'-dicarboxyldiphenyl ether, etc., and mixtures of these. All of these acids contain at least one aromatic nucleus. Fused rings can also be present, such as in 1,4-or 1,5-napthalenedicarboxylic acids. The preferred dicarboxylic acids are terephthalic acid or a mixture of terephthalic and isophthalic acids.

A preferred polyester may be derived from the reaction of either the cis- or trans-isomer (or a mixture thereof) of 1,4-cyclohexanedimethanol with a mixture of isophthalic and terephthalic acids. These polyesters have repeating units of the formula:

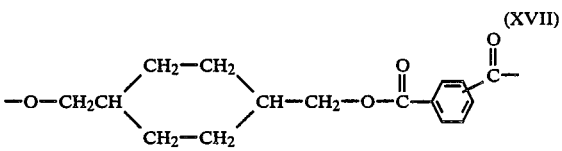
(XVII)

Another preferred polyester is a copolyester derived from a cyclohexane dimethanol, an alkylene glycol and an aromatic dicarboxylic acid. These copolyesters are prepared by condensing either the cis- or trans-isomer (or mixtures thereof) of, for example, 1,4-cycohexanedimethanol and an alkylene glycol with an aromatic dicarboxylic acid so as to produce a copolyester having repeating units of the following formula:

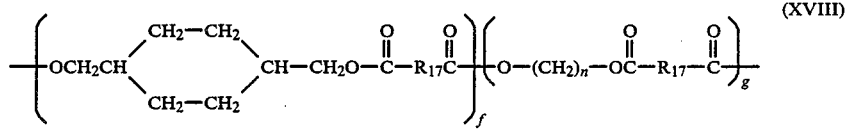
(XVIII)

wherein the cyclohexane ring is selected from the cis- and trans-isomers thereof, $R_{17}$ is as previously defined, n is an integer of 2 to 10, the f unit comprise from about 10 to about 90 percent by weight and the g units comprise from about 10 to about 90 percent by weight.

The preferred copolyester may be derived from the reaction either the cis- or trans-isomer (or mixtures thereof) of 1,4-cyclohexanedimethanol and ethylene glycol with terephthalic acid in a molar ratio of 1:2:3. These copolyesters have repeating units of the following formula:

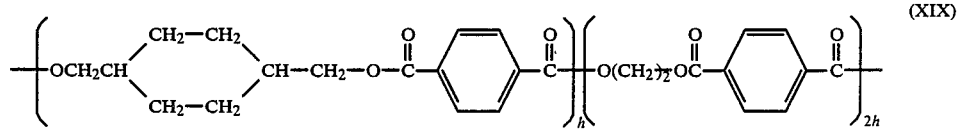
(XIX)

wherein h can be 10 to 10,000. Block as well as random copolymers are possible.

The polyester as described herein are either commercially available or can be produced by methods well known in the art, such as those set forth in, for example, U.S. Pat. No. 2,901,466.

The polyesters used herein have an intrinsic viscosity of from about 0.4 to about 2.0 dl/g. as measured in a 60:40 phenol/tetrachloroethane mixture or similar solvent at 23° to 30° C.

F. Aromatic Polycarbonate

The thermoplastic aromatic polycarbonates that can be employed herein are homopolymers and copolymers and mixtures thereof, which have an intrinsic viscosity of from about 0.4 to about 1.0 dl./g. as measured in methylene chloride at 25° C. The polycarbonates are prepared by reacting a dihydric phenol with a carbonate precursor. Typical of some of the dihydric phenols that may be employed are bisphenol-A, bis(4-hydroxyphenyl)methane, 2,2-bis(4-hydroxy-3-methylphenyl)propane, 4,4-bis(4-hydroxyphenyl)heptane, 2-2-(3,5,3',5'tetrabromo-4,4'-dihydroxydiphenyl)propane, (3,3'-dichloro-4,4'dihydroxydiphenyl)methane, and the like. Other dihydric phenols of the bisphenol type are described in, for example, U.S. Pat. Nos. 2,999,835, 3,028,365 and 3,334,154.

It is, of course, possible to employ two or more different dihydric phenols or a copolymer of a dihydric phenol with a glycol or with hydroxy or acid terminated polyesters.

The carbonate precursor may be either a carbonyl halide, a carbonate ester, or a haloformate. The carbonyl halides which can be employed herein are carbonyl bromide, carbonyl chloride and mixtures thereof. Typical of the carbonate esters which may be employed herein are diphenyl carbonate, di-(halophenyl)carbonates, such as di-(chlorophenyl)carbonate or di-(bromophenyl)carbonate, etc., di(alkylphenyl)carbonates such as di(tolyl)carbonate, di(naphthyl)carbonate, di(chloronaphthyl)carbonate, etc. or mixtures thereof. The haloformates suitable for use herein include bishaloformate of dihydric phenols for example, bischloroformates of bisphenol-A, of hydroquinone, etc. or glycols for example, bishaloformates of ethylene glycol, neopentyl glycol, polyethylene glycol, etc. While other carbonate precursors will be apparent to those skilled in the art, carbonyl chloride, also known as phosgene, is preferred.

The aromatic polycarbonate polymers may be prepared by methods well known in the art by using phosgene or a haloformate and by employing a molecular weight regulator, an acid acceptor and a catalyst. The molecular weight regulators which can be employed in carrying out the process include monohydric phenols, such as phenol, para-tertiarybutylphenol, para-bromophenol, primary and secondary amines, etc. Preferably, a phenol is employed as the molecular weight regulator.

A suitable acid acceptor may be either an organic or an inorganic acid acceptor. A suitable organic acid acceptor is a tertiary amine and includes materials, such as pyridine, triethylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed herein can be any of the suitable catalysts that aid the polymerization of, for example, bisphenol-A with phosgene. Suitable catalysts include tertiary amines, such as triethylamine, tripropyl-amine, N,N-dimethylaniline, quaternary ammonium compounds, such as tetraethylammonium bromide, cetyl triethyl ammonium bromide, tetra-n-heptylammonium iodide, and quaternary phosphonium compounds, such as n-butyltriphenyl-phosphonium bromide and methyl-triphenyl phosphonium bromide.

The polycarbonates can be prepared in a one-phase (homogeneous solution) or a two-phase (interfacial) systems when phosgene, or a haloformate are used. Bulk reactions are possible when the diarylcarbonate precursors are used.

Also, aromatic polyester carbonates be used. These are described in, for example, U.S. Pat. No. 3,169,121. The preferred polyester carbonate results from the condensation of phosgene, terephthaloyl chloride, isophthaloyl chloride with bisphenol-A and a small amount of p-tertbutylphenol.

G. Polyhydroxyethers

The thermoplastic polyhydroxyethers which may be used herein have the following general formula:

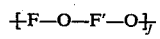

where F is the radical residuum of a dihydric phenol, F' is a radical residuum of an epoxide selected from mono- and diepoxides and which contain from 1 to 2 hydroxyl groups, and j is an integer which represents the degree of polymerization and is at least about 30 and preferably is above about 80.

In general, thermoplastic polyhydroxyethers are prepared by contacting, under polymerization conditions, a dihydric phenol and an epoxide containing from 1 to 2 epoxide groups in substantially equimolar amounts by methods well known in the art.

Any dihydric phenol can be used in forming polyhydroxy-ethers. Illustrative dihydric phenols are mononuclear dihydric phenols such as hydroquinone, resorcinol, and the like as well as the polynuclear phenols. The dihydric polynuclear phenols have the general formula:

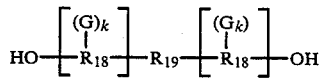

wherein the $R_{14}$'s are independently an aromatic divalent hydrocarbon radical, such as naphthylene and phenylene with phenylene being preferred, the G's may be the same or different and are selected from alkyl radicals, such as methyl, n-propyl, n-butyl, n-hexyl, n-octyl and the like, preferably alkyl radicals having 1 to 4 carbon atoms; halogen atoms, i.e., chlorine, bromine, iodine, or fluorine; or alkoxy radicals such as methoxy, methoxymethyl, ethoxy, ethoxyethyl, n-butyloxy, amyloxy and the like, preferably an alkoxy radical having 1 to 4 carbon atoms, the k's are independently integers of 0 to 4, $R_{19}$ is independently selected from a divalent saturated aliphatic hydrocarbon radical particularly alkylene or alkylidene radicals having from 1 to 8 carbons atoms, especially $C(CH_3)_2$, cycloalkylene, cycloalkylidene or any other divalent group such as O, S, SO, $SO_2$, CO, a chemical bond, etc. Particularly preferred are dihydric polynuclear phenols having the general formula:

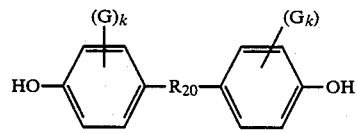

wherein G and k are as previously defined, and $R_{20}$ is an alkylene or alkylidene group, preferably having from 1 to 3 carbon atoms, cycloalkylene or cycloalkylidene having 6 to 12 carbon atoms.

Diepoxides useful for the preparation of polyhydroxyethers may be represented by repeating units of the following formula:

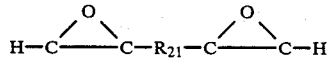

wherein $R_{21}$ is representative of a bond between adjacent carbon atoms or a divalent organic radical such as an aliphatic, aromatic, alicyclic, heterocyclic or acyclic arrangement of atoms.

Other diepoxides which can be mentioned include those wherein two oxirane groups are linked through an aromatic ether, i.e., compounds having the grouping:

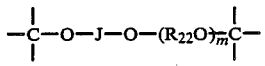

wherein $R_{22}$ is a divalent organic radical, J is a divalent aromatic radical residuum of a dihydric phenol, such as those listed above in the description of dihydric phenols, and m is an integer from 0 to 1 inclusive.

Still other diepoxides include ethers wherein the oxirane groups are connected to vicinal carbon atoms at least one pair of which is a part of a cycloaliphatic hydrocarbon.

These polyhydroxy ethers are prepared by methods well known in the art such as those described in, for example, U.S. Pat. Nos. 3,238,087; 3,305,528; 3,924,747; and 2,777,051.

H. Polyamides

The polyamide polymers which may be used herein are well known in the art. The polyamide polymers include homopolymers as well as copolymers. These polymers may be formed by conventional methods from the condensation of bifunctional monomers, by the condensation of diamines and dibasic acids, as well as by addition polymerization. Numerous combinations of diacids, such as carbonic acid, oxalic acid, glutaric acid, adipic acid, pimelic acid, suberic acid, azelaic acid, sebacic acid, dodecanedioic acid, isophthalic acid, terephthalic acid, and the like, diamines, such as hydrazine, ethylenediamine, hexamethylenediamine, 1,8-octanediamine, piperazine, and the like, and amino acids are possible. The chains between functional groups in the reactants may comprise linear or branched aliphatic hydrocarbons, or alicyclic or aromatic rings. They may also contain hetero atoms such as oxygen, sulfur, and nitrogen. Secondary diamines lead to the formation of N-substituted polyamides.

Also, included herein are the aromatic polyamide polymers which are aromatic in both the diamine and the dibasic acid. The dibasic acids include terephthalic acid, isophthalic acid, phthalic acid, and the like. The aromatic diamines include o-phenylenediamine, 2,4-diaminotoluene, 4,4'-methylenedianiline, and the like.

The polyamide polymers are prepared by methods well known in the art, such as by direct amidation which is the reaction of amine groups with carboxyls accompanied by elimination of water; low temperature polycondensation of diamines and diacid chlorides, ring-opening polymerization, addition of amines to activated double bonds, polymerization of isocyanates and reaction of formaldehyde with dinitriles.

The polyamide polymers include polyhexamethyleneadipamide, i.e., nylon 6,6; poly(e-caprolactam), i.e., nylon-6; polypropiolactam, i.e., nylon-3; poly(pyrrolidin-2-one), i.e., nylon-4; poly(1-enanthamide), i.e., nylon-7; polycapryllactam, i.e., nylon-8; poly(1-pelargonamide), i.e., nylon-9; poly(11-aminodecanoic acid), i.e., nylon-10; poly(1-undecaneamide), i.e., nylon-11; polyhexamethyleneterephthalamide, i.e., nylon-6,T, nylon 6,10, and the like.

I. Poly(arylene sulfide)

The poly(arylene sulfide)s which are suitable for use herein are solid, have a melting point of at least about 150° F. and are insoluble in common solvents. Such resins can be conveniently prepared by the process disclosed in, for example, U.S. Pat. No. 3,354,129. Briefly, the process comprises the reaction of an alkali metal sulfide and a polyhalo ring-substituted aromatic compound in the presence of a suitable polar organic compound, as for example, the reaction of sodium sulfide with dichlorobenzene in the presence of N-methyl-2-pyrrolidone to form poly(phenylenesulfide).

The resulting polymer contains the aromatic nucleus the polyhalo-substituted monomer coupled in repeating units predominantly through a sulfur atom. The polymers which are preferred for use according to this invention are those polymers having the repeating unit —$R_{23}$—S— where $R_{23}$ is phenylene, biphenylene, naphthylene, or a lower alkyl-substituted derivative thereof. By lower alkyl is meant alkyl groups having one to six carbon atoms such as methyl, propyl, isobutyl, n-hexyl and the like.

The preferred poly(arylene sulfide) is poly(phenylene sulfide), a crystalline polymer with a repeating structural unit comprising a para-substituted benzene ring and a sulfur atom which may be described by the following formula, where p has a value of at least about 50.

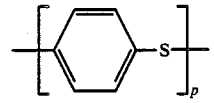

Suitable poly(phenylene sulfide) compositions are available commercially under the trade name Ryton of the Phillips Petroleum Company. Preferably, the poly(phenylene sulfide) component has a melt flow index, measured at 600° F. using a 5 Kg. weight and a standard orifice, within the range of from about 10 to about 7000 dg./minute.

The term poly(arylene sulfide) is meant to include not only homopolymers but also arylene sulfide copolymers, terpolymers and the like.

OTHER ADDITIVES

Other additives which may be used in combination with the thermoplastic polymers include mineral fillers such as carbonates including chalk, calcite and dolomite; silicates including mica, talc, wollastonite; silicon dioxide; glass spheres; glass powders; aluminum; clay; quartz; and the like. Additional additives include glass fibers; pigments, such as titanium dioxide; thermal stabilizers such as zinc oxide; ultraviolet light stabilizers, plasticizers, and the like.

The mineral fillers may be used in amounts of up to about 30, preferably up to about 25 weight percent. The pigments are generally used in amounts of up to about 10 weight percent. The stabilizers are used in stabilizing amounts to stabilize the composition for the effect desired.

FABRICATION

The thermoplastic polymer, and one or more optional additives is generally compounded in an extruder. The compounding is carried out at temperatures of from about 200° C. to about 400° C. The compounded material may be pelletized by conventional techniques.

The compounded material is extruded into a sheet and then thermoformed into the desired article by methods well known in the art.

The thermoplastic polymer either alone or in combination with other materials may be fed in particulate form (such as pellets, granules, particles, powders, and the like) into an extruder which extrudes the material into a laminate. The extruders which are used to form the laminate are well known in the art. Typically, the extruder may be a 2½ inch Davis standard extruder containing an extruder screw with a length to diameter ratio of 24 to 1.

The laminate may be prepared by the procedure and using the apparatus as described in U.S. Pat. No. 3,557,265. In the method of said patent, film or sheet having a plurality of layers is formed by deforming a flowing stream having layers of diverse thermoplastic material wherein the cross-sectional configuration of the plurality of flowing streams is altered by reducing the dimension of the stream in a direction generally perpendicular to the interfaces between the individual streams and by increasing the dimension of the stream in a direction generally parallel to the interface to provide a sheet having a laminar structure.

The laminates of this invention are preferably prepared using an extrusion apparatus with a Cloren die (available from the Cloren Die Company, Orange, Tex.). This die is described in U.S. Pat. Nos. 4,600,550; 4,533,308; 4,197,069 and 4,152,387. The use of the Cloren die permits forming laminates from polymers of varying viscosities, in that it is capable of overcoming the curtaining effect for resins of varying viscosities.

Specifically, the Cloren die is described in U.S. Pat. Nos. 4,600,500 and 4,533,308. The Cloren die is a multimanifold die that is capable of overcoming the curtaining effect for resins of varying viscosities by removal and replacement of a component thereof with an interchangeable component configured for a specific resin viscosity. In said U.S Pat. No. 4,600,550, a process for forming multi-layer laminates, whereby the curtaining effect is minimized or eliminated, is described. This process comprises (1) passing a molten thermoplastic stream that is flowing at a relatively greater pressure at a side-to-side midpoint than at the sides thereof, through a multimanifold die restriction channel of increasing cross-sectional area from the center thereof to each end thereof, so that the molten stream is subjected to an inverse resistance to flow and thereby caused to flow at substantially equal pressure from side to side; (2) while maintaining said substantially equal pressure, expanding the cross-sectional thickness of the molten stream; (3) while continuing to maintain said substantially equal pressure, reducing the cross-sectional thickness of the expanded stream; (4) converging the thickness-reduced molten stream with at least one other thickness-reduced stream that is flowing at substantially equal pressure from side to side, to form a melt-laminate, and (5) maintaining said substantially equal flow pressure for each stream of said melt-laminate, until said melt-laminate exits from the multimanifold die.

The laminates of this invention may be prepared using a Cloren die, especially if the laminate is to be made from polymers having varying viscosity difference between them. In such a process, molten thermoplastic streams are passed through separate channels of a multimanifold die so that the molten streams converge, while maintaining substantially equal flow pressure for each stream, to form a melt-laminate and maintaining substantially equal flow pressure for each stream of the melt-laminate until it exits from the multimanifold die.

The laminates of this invention are generally from about 20 to about 40 mils, preferably about 30 mils thick. The inner layer ranges from about 5 to about 15 mils in thickness.

The laminate is then thermoformed into the shape of the desired article. Thermoforming may be accomplished by methods well known in the art such as those described in, for example, Engineering Polymer Science and Technology, Volume 13, 1971, pages 832-843. Generally, the laminate is vacuum formed into a female mold. In this process, the laminate is locked in a frame around its periphery only, is heated to a predetermined temperature for a predetermined time and then brought into contact with the edge of the mold. This contact creates a seal so that it is possible to remove the air between the hot laminate and the mold, allowing atmospheric pressure to force the hot laminate against the mold. Also, the laminate may be draped manually to the required contour of a female mold, such as to make a seal possible. Positive air pressure may also be applied against the top of the laminate to force it into a female mold as an alternative to vacuum forming.

To promote uniformity of distribution in cookware of particular shapes such as a box shape, a plug assist may be used. This may be any type of mechanical helper which carries extra material toward an area which would otherwise be too thin. Usually the plug is made of metal, and heated to a temperature slightly below that of the hot plastic, so as not to cool the laminate before it can reach its final shape. Instead of metal, a smooth grained wood can be used or a thermoset plastic, such as phenolic or epoxy. These materials are poor conductors of heat and hence do not withdraw much heat from the sheet. Plug assists are adaptable both to vacuum forming and pressure forming techniques.

Another method which can be used to thermoform the laminate is matched mold forming. In this method, the laminate is locked into a clamping frame and heated to the proper forming temperature. A male mold is positioned on the top or bottom platen with a matched female mold mounted on the other platen. The mold is then closed, forcing the laminate to the contours of both molds. The clearance between the male and female molds determines the wall thickness. Trapped air is allowed to escape through both mold faces. Molds are held in place until the laminate cools.

In a preferred embodiment, the laminate is locked into a frame around its periphery only. The laminate is then heated in an oven to a temperature above the glass transition of the polymer(s) in the laminate, which is generally between about 530° and about 600° F. The laminate is heated at this temperature for about 15 to about 20 seconds so that the laminate sags under its own weight. The laminate is then brought into contact with the edge of a female mold so as to create a seal between the hot plastic and the mold. The female mold is positioned in the top platen. A vacuum is then started so that the laminate is pulled into the confines of the female mold. The mold temperature is generally from about 240° to about 380° F. The material is allowed to remain in the mold for about 30 seconds so that it cools from its initial temperature of between 530° and 600° F. to the mold temperature which is from about 240° to about 380° F. The formed laminate at this point is rigid and can be removed from the mold. The preferred molding procedure results in a better distribution of thickness of material in the molded article. Also, the molded articles is generally free of pin holes when this procedure, is used. In a variation of the preferred procedure, the laminate is forced into the female mold with a plug assist. The plug is so positioned that it carries the laminate into the female mold but does not touch any part of the mold. The vacuum is then turned on so that the laminate forms to the contours of the female mold. The formed laminate is allowed to cool as described above and then removed from the mold.

COOKWARE

The cookware of this invention may be any type of container or tray which is used to heat or cook food. The cookware may be of any shape or design with dimensions dependent upon the desired end use. Representative cookware is found in, for example, U.S. Pat. No. 3,938,730; 3,743,077 and 3,955,170. Also, representative designs of cookware are described in, for example, U.S. Pat. Nos. Des. 236,574; 194,277 and 236,182. The cookware may be used to heat and bake all types of food, including frozen food in a coventional or microwave oven.

EXAMPLES

The following examples serve to give specific illustrations of the practice of this invention but they are not intended in any way to limit the scope of this invention.

The following designations used in the Examples have the following meaning:

Polyarylethersulfone: A polymer having the following repeating unit:

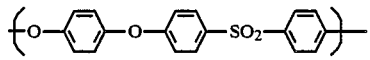

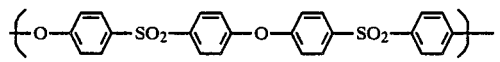

The polymer has a reduced viscosity of 0.61 dl/g as measured in N-methyl-pyrrolidinone (0.2 g/100 ml) at 25° C.

Polyethylene terephthalate (PET) Vituf 1001 A obtained from Goodyear Chemicals. This polymer has an intrinsic viscosity of 1.04 dl/g. as measured in 60/40 phenol/tetrachloroethane at 25° C.

Polycarbonate (PC): Lexan 101 obtained from General Electric Company. This polymer has a reduced viscosity of 0.64 dl/g as measured in chloroform at 25° C.

PREPARATION OF POLYARYLETHERSULFONE

A four neck 1000 ml round-bottom flask was equipped with a mechanical stirrer, thermometer, addition funnel, dry nitrogen inlet, and vacuum jacketed vigreux column with Dean Stark trap and condenser. Into the flask were charged 143.58 g (0.50 moles) of 4,4'-dichlorodiphenyl sulfone, 62.58 g (0.25 moles) of 4,4'-dihydroxydiphenyl sulfone, 27.56 g (0.25 moles) of hydroquinone, 76.02 g (0.55 moles) of potassium carbonate, 100 ml of toluene and 466 ml of sulfolane. The mixture was purged with nitrogen for 1 hour at room temperature (about 25° C.) and then heated to reflux (141° C.). After 1 hour at reflux, the temperature of the reaction was increased to about 200° C. by slowly removing the toluene. After about 5 hours at 200° C., the reaction was terminated by adding methyl chloride. The polymer so produced was recovered by coagulation in water followed by washing the polymer several times with hot water (80° C.).

The polyarylethersulfone product had a reduced viscosity of 0.61 dl/g as measured in N-methyl-pyrrolidinone (0.2 g/100 ml) at 25° C. The polymer was made up of the following repeating unit:

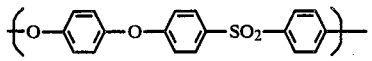

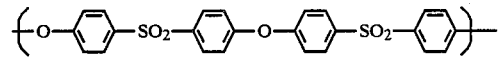

PREPARATION OF LAMINATES; CONTROLS AND EXAMPLE

A Reed Color Master Batch of titanium dioxide in polyethylene terephthalate which contained 40% by weight of titanium dioxide was diluted with PET to a contained level of 2% by weight of titanium dioxide by dry tumbling. This composition was dried at 300° for about 6 hours. This composition was then fed into 2½ inch, 24:1 (L:D) Davis standard extruder. At the same Polyarylethersulfone was fed into a 1¼ Satellite Extruder. The die was 35 inches. A 30 mil co-extruded laminate was produced having 12 mils of PET as the outside layers and a 6 mil core layer of Polyarylethersulfone. This was the Control.

The procedure was repeated except that Polyarylethersulfone was substituted for the PET and Polycarbonate for the Polyarylethersulfone. A 30 mil co-extruded laminate was produced having 6 mils of Polyarylethersulfone as the outside layers and a 24 mil core layer of Polycarbonate.

GENERAL PROCEDURE OF FABRICATION OF COOKWARE FROM LAMINATES

The laminates made above were thermoformed into cookware which was a tray 7¼ inches long, 5¼ inches long and 1 inch deep. The laminate was first placed into a frame and clamped. The frame was placed between two heaters which were at about 1200° F. for about 25 seconds until the laminate began to "sag" under its own weight. The temperature of the laminate at this point was between 530° and 600° F. The laminate was then placed into contact with a female mold which was in the bottom platen of a press. The female mold was raised into contact with the laminate so as to form a tight seal with the laminate. A vacuum was started and the laminate contacted the female mold. The mold temperature was about 275° to 350° F. The laminate was in contact with the female mold for about 30 seconds. The mold was retracted and the tray formed was released. Total cycle time was about 90 seconds. The tray was then trimmed. The average gauge thickness of the tray was 30 mils.

TOASTER OVEN TEST RESULTS

TRAY: 14 ounce Square
FOOD: 14 ounce Lasagna
CONDITIONING: 24 hours min @ −6° C., aluminum foil oil removed for cooking

| OVEN CONDITIONS | CONTROL | EXAMPLE |
|---|---|---|
| 400° F., 45 min. | Lip not sturdy, Lip deformed, indented shape | Lip sturdy No deformation, holds |
| 425° F., until food reaches 165° F. | Not sturdy, tray does not hold up well, lip deformed | Sturdy, holds shape |
| 450° F., until food reaches 165° F. | Not tested | Deformed lip, but feels sturdy. Bubbles in lip |
| 475° F., until food reaches 165° F. | Not tested | Lip distorted, barely sturdy; bubbles in lip |

TOASTER OVEN TEST RESULTS

TRAY: Oblong Dish
FOOD: 12 ounces Macaroni and Cheese
CONDITIONING: 24 hours min. @ −6° C., aluminum foil crimped over tray; foil removed for cooking

| OVEN CONDITIONS | CONTROL | EXAMPLE |
|---|---|---|
| 400° F., 35 min. | Not sturdy; lip distorts; food tends to spill | Sturdy, holds shape |
| 425° F., until food reaches 165° F. | Totally unstable; food fell off dish | Sturdy, holds shape |
| 450° F., until food reaches 165° F. | Not tested | Lip slightly distorted, but still sturdy |

DROP TESTS

TRAY: 7½" Round Tray
FOOD LOAD: 8½ ounces Cooked Rice
CONDITIONING: 24 hours min. at −6° C. Foil crimped around tray
DROP: On edge, using guides to insure orientation

| CONTROL | EXAMPLE |
|---|---|
| 50% Failure @ 5' | No failures @ 7' (10 samples) |

The following example illustrates forming a laminate of this invention using a Cloren die. The laminate had a thickness of 24 mils and was produced having 4.8 mil outer layers of Polyethersulfone and 14.4 mils of PET as the inner or core layer. The PET was fed into a 1½ inch Sterling extruder fitted with a 13.5 inch Cloren die and at the same time, the Polarylethersulfone was fed into a 1 inch Egan extruder. The extrusion conditons were the following:

| | 1½" Extruder | 1" Extruder |
|---|---|---|
| Barrel Zone Temperature (°F.) | | |
| Zone 1 | 630 | 630 |
| Zone 2 | 682 | 660 |
| Zone 3 | 524 | 710 |
| Zone 4 | 452 | 750 |
| Melt Temperature (°) | 500 | 745 |
| Screw speed (%/RPM) | 35/40 | 54/25 |
| Amps | 6.0 | 1.1 |
| Head Pressure (psi) | — | 400 |
| Adaptor Feedblock Temperature (°F.) | 592 | |
| Die Zone Temperature (°) | | |
| Zone 1 | 632 | |
| Zone 2 | 632 | |
| Zone 3 | 632 | |
| Winder Setting/FPM | 66/8 | |
| Pull Roll Setting | 90 | |

What is claimed is:

1. A laminate comprising at least three sheets, an inside sheet made from the following polymers:

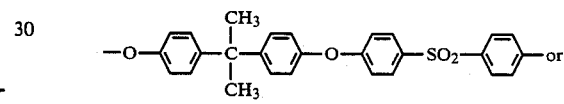

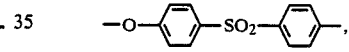

or combinations thereof, and two outside sheets made from the following polymer:

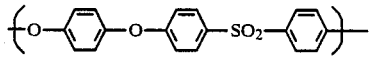

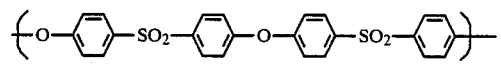

2. A laminate as defined in claim 1, wherein the thermoplastic resin contains glass spheres.

* * * * *